United States Patent [19]

McWilliams et al.

[11] Patent Number: 4,894,212

[45] Date of Patent: Jan. 16, 1990

[54] SYNTHESIS OF CRYSTALLINE SILICATE ZSM-11

[75] Inventors: John P. McWilliams, Woodbury, N.J.; Mae K. Rubin, Bala Cynwyd, Pa.

[73] Assignee: Mobil Oil Corp., New York, N.Y.

[21] Appl. No.: 75,496

[22] Filed: Jul. 20, 1987

[51] Int. Cl.$^4$ .............................................. C01B 33/28
[52] U.S. Cl. ................................................... 423/328
[58] Field of Search .................. 423/328, 329, 326; 252/188.31; 502/77

[56] References Cited

U.S. PATENT DOCUMENTS

| | | | |
|---|---|---|---|
| 3,709,979 | 1/1973 | Chu | 423/328 |
| 4,108,881 | 8/1978 | Rollmann et al. | 260/448 |
| 4,139,600 | 2/1979 | Rollmann et al. | 423/329 |
| 4,151,189 | 4/1979 | Rubin et al. | 260/448 |
| 4,205,053 | 5/1980 | Rollmann et al. | 423/329 |
| 4,275,047 | 6/1981 | Whittam | 423/329 |
| 4,296,083 | 10/1981 | Rollmann | 423/329 |
| 4,341,748 | 7/1982 | Plank et al. | 423/328 |
| 4,495,166 | 1/1985 | Calvert et al. | 423/329 |
| 4,526,879 | 7/1985 | Dwyer et al. | 502/71 |
| 4,650,655 | 3/1987 | Chu et al. | 423/328 |

OTHER PUBLICATIONS

Miale et al., "Catalysis by Crystalline Aluminosilicates IV Attainable Catalytic Cracking Rate Constants, and Superactivity", J. Catal., vol. 6 (1966), pp. 278-287.
Olson et al., "Chemical and Physical Properties of the ZSM-5 Substitutional Series", J. Catal., vol. 61 (1980), pp. 390-396.

*Primary Examiner*—Robert L. Stoll
*Assistant Examiner*—R. Bruce Breneman
*Attorney, Agent, or Firm*—Alexander J. McKillop; Charles J. Speciale; Dennis P. Santini

[57] ABSTRACT

This invention relates to a new form of crystalline silicate identified as zeolite ZSM-11, to a new and useful improvement in synthesizing said crystalline silicate and to use of said crystalline silicate prepared in accordance herewith as a catalyst for organic compound, e.g. hydrocarbon compound, conversion.

11 Claims, No Drawings

SYNTHESIS OF CRYSTALLINE SILICATE ZSM-11

BACKGROUND OF THE INVENTION

1. Field Of The Invention

This invention relates to a new and useful improvement in synthesizing crystalline silicate having the structure of ZSM-11, and the new ZSM-11 synthesized More particularly, this invention relates to an improved method for preparing crystalline silicate ZSM-11 whereby synthesis is facilitated and reproducible and the silicate product high purity and catalytic utility.

2. Discussion Of Prior Art

Crystalline silicate ZSM-11 and its conventional preparation, e.g. from a reaction mixture containing a quaternary compound directing agent, such as a tetrabutylammonium compound, are taught by U.S. Pat. No. 3,709,979, the entire disclosure of which is incorporated herein by reference. It has a distinctive X-ray diffraction pattern which identifies it from other known crystalline silicates. Synthesis of crystalline silicate ZSM-11 from a reaction mixture containing $C_7$–$C_{12}$ alkylenediamines as directing agent is taught in U.S. Pat. No. 4,108,881, the entire disclosure of which is incorporated herein by reference.

U.S. Pat. No. 4,296,083 claims synthesizing zeolites characterized by a Constraint Index of 1 to 12 and an alumina/silica mole ratio of not greater than 0.083 from a specified reaction mixture containing an organic nitrogen-containing cation, depending upon the particular zeolite desired, provided by, for example, an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine. U.S. Pat. No. 4,139,600 teaches a method for synthesis of zeolite ZSM-5 (U.S. Pat. No. 3,702,886) from a reaction mixture comprising, as a directing agent, an alkyldiamine, e.g. pentanediamine or hexanediamine.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. Octylamine is shown in said patent to direct synthesis from a particular reaction mixture of crystalline zeolite ZSM-5.

U.S. Pat. No. 4,341,748 shows synthesis of ZSM-5 or ZSM-11 from reaction mixtures comprising, for example, ethanol, ZSM-5 or ZSM-11 seeds, ethanol and seeds, ethanol and ammonium hydroxide, and ethanol, ammonium hydroxide and seeds. U.S. Pat. No. 4,100,262 teaches synthesis of ZSM-5 from a reaction mixture comprising a tetraalkylammonium source and a tetraureacobalt (II) complex.

U.S. Pat. No. 4,526,879 shows synthesis of ZSM-5 from a reaction mixture comprising a combination of a $C_1$–$C_6$ primary alkylamine and a $C_1$–$C_6$ alkylhalide. U.S. Pat. No. 4,495,166 teaches synthesis of ZSM-5 or ZSM-11 by replacing a portion of the conventionally used quaternary ammonium directing agent with an amine, resulting in a reaction mixture containing both an amine and a quaternary ammonium compound.

Applicant knows of no prior art for preparing crystalline silicate ZSM-11 utilizing as directing agent octylamine as required of the present invention.

SUMMARY OF THE INVENTION

An improved, economical and reproducible method for preparing crystalline silicate identified as zeolite ZSM-11 exhibiting high purity, catalytic activity and other valuable properties is provided. The method comprises forming a reaction mixture containing a source of alkali metal cations, octyalmine directing agent, a source of silicon, seeds of ZSM-11 structure and water and having a composition, in terms of mole ratios, within the following ranges:

|  | Broad | Preferred | Most Preferred |
| --- | --- | --- | --- |
| $SiO_2/Al_2O_3$ | 40–2000 | 50–1000 | 60–200 |
| $H_2O/SiO_2$ | 5–50 | 8–30 | 8–20 |
| $OH^-/SiO_2$ | 0.05–0.5 | 0.1–0.3 | 0.15–0.25 |
| $M/SiO_2$ | 0.05–0.5 | 0.15–0.4 | 0.2–0.35 |
| $R/SiO_2$ | 0.03–1.0 | 0.05–0.4 | 0.05–0.3 | wherein R is octylamine and M is an alkali metal ion, and maintaining the mixture until crystals of the desired crystalline silicate ZSM-11 are formed. The quantity of $OH^-$ is calculated only from the inorganic sources of alkali without any organic base contribution. This reaction mixture will have at least 0.01 wt.%, preferably at least 0.1 wt.%, and even more preferably from about 1 wt.% to about 5 wt.% seed crystals.

Reaction conditions for crystallizing ZSM-11 from the above mixture include heating the reaction mixture to a temperature of from about 100° C. to about 350° C. for a period of time of from about 12 hours to about 10 days. A more preferred temperature range is from about 120° C. to about 150° C. with the amount of time at a temperature in such range being from about 16 hours to about 5 days.

The reaction is carried out until a fully crystalline product is formed. The solid product comprising ZSM-11 is recovered from the reaction medium, as by cooling the whole to room temperature, filtering and water washing.

EMBODIMENTS

Zeolite ZSM-11 synthesized by conventional procedure is proven to have catalytic application. When the crystalline silicate is synthesized in accordance with the present method, it exhibits excellent catalytic activity for certain conversions of interest, including hydrocracking and dewaxing. Further, the directing agent for the present method is readily commercially available and of significantly lower cost than quaternary ammonium or phosphonium and diamine compounds used for that purpose in the prior art. The use of cost effective silica precursor, hereinafter more particularly defined, allows for high solids loading which produces even higher product yield. The present method provides low cost, pure ZSM-11 crystals with low alkali metal levels. The product can be ion exchanged without a pre-calcination step, giving further economic advantage over prior art ZSM-11 synthesis methods.

The particular effectiveness of the presently required directing agent, coupled with the presence of ZSM-11 seeds, when compared with other directing agents, such as those identified above, is believed due to its ability to function as a crystallization directing agent in the nucleation and growth of zeolite ZSM-11 crystals.

The synthesis of the present invention is facilitated when the reaction mixture comprises seed crystals having the structure of ZSM-11. The use of at least 0.01%, preferably at least about 0.10%, and even more preferably from about 1% to about 5% seed crystals (based on total weight of silica in the reaction mixture) will facilitate crystallization in the present method.

The reaction mixture composition for the synthesis of synthetic crystalline silicate hereby can be prepared utilizing materials which can supply the appropriate oxide. Such compositions include, when a separate source of aluminum is desired, aluminates or alumina; and silicates (preferably silica precursor), silica hydrosol, silica gel, silicic acid and hydroxides. It will be understood that each oxide component utilized in the reaction mixture for preparing zeolite ZSM-11 can be supplied by one or more essential reactants and they can be mixed together in any order. For example, any oxide can be supplied by an aqueous solution, sodium hydroxide or by an aqueous solution of a suitable silicate. The reaction mixture can be prepared either batchwise or continuously. Crystal size and crystallization time for the product composition comprising ZSM-11 will vary with the exact nature of the reaction mixture employed.

Preferred sources of silicon for the reaction mixture of the present invention are solid silicas or silica precursors. Such sources are cost effective and allow high solids loading of the reaction mixture. The use of a solid silica, e.g. Ultrasil (a precipitated, spray dried silica) or HiSil (a precipitated hydrated $SiO_2$ containing about 6 weight percent free $H_2O$ and about 4.5 weight percent bound $H_2O$ of hydration and having a particle size of about 0.02 micron) as the oxide of silicon source favors ecionomic synthesis of ZSM-11 from the above reaction mixture. Such solid silica sources are commercially available.

The silica precursor source of silicon for the present reaction mixture is an amorphous silica precipitate made from a solution of a soluble silica source. Conveniently, the solution is an aqueous solution of a pH ranging from 9 to 12. The source of silica can be any soluble silicate and is preferably sodium silicate. The silica precursor is formed by its continuous precipitation from the solution phase. Accordingly, precipitation comprises initiating precipitation and maintaining said precipitation.

Alteration of the composition of the solution of soluble silica source is undertaken by introducing a precipitating reagent. In one embodiment, the precipitating reagent is a source of acid. Thus, the precipitating reagent can be an acid solution. The acid of the solution may be any mineral acid, such as $H_2SO_4$, HCl, $HNO_3$, etc., and can have a pH ranging from essentially 0 to about 6. Thus, precipitation of the silica precursor can be effected by acid neutralization of a basic solution of a silicate.

The silica can be precipitated alone in the absence of sources of other zeolitic framework elements, e.g. aluminum. In this fashion, both the precipitating reagent and the solution of silica source can be free of intentionally added alumina or alumina source. That is, no aluminum is deliberately added to the silica precipitation reaction mixture, in this embodiment; however, aluminum is ubiquitous and the presence of such a material in minor amounts is due to impurities in the precursors of the reactants or impurities extracted from the reaction vessel. When no source of alumina is added, the amount of alumina in the silica precursor precipitate will be less than about 0.5 weight percent, and generally less than 0.2 weight percent. When a source of alumina is added, the amount of alumina in the silica precursor precipitate will be up to about 5 weight percent. Silicate precipitation can be coprecipitation in the presence of soluble sources of other zeolie framework elements including gallium, indium, boron, iron and chromium. The soluble source of these other zeolitic framework components can be, for example, nitrates. The coprecipitation product would be amorphous, for example an amorphous gallosilicate, borosilicate or ferrosilicate.

Continuous precipitation of the amorphous silica precursor may comprise introducing the solution of silica source and the precipitating reagent to a reaction zone while maintaining a molar ratio of silica source to precipitating reagent substantially constant. For example, the precipitating reagent and the silica source are introduced simultaneously into the reaction zone.

The continuous precipitation of silica precursor effects two results. Firstly, silica gel formation is at least substantially eliminated and secondly, precipitated silica precursor particle size exceeds that silica particle size at which silica gel formation is possible. The precipitated silica precursor comprises agglomerated solids in the shape of microspheres. Suspensions of these particles exhibit low viscosities at high solids loading in the subsequent zeolite synthesis reaction mixture of the present invention, even at solids loading equal to or greater than about 20-40%. The particle size of the precipitated silica precursor ranges between 1-500 microns, but the average size is 50-100 microns.

Other conditions affecting precipitation of silica precursor include time, pH and temperature. The temperature of the precipitation mixture can range from 80° F. to 300°F. (about 27°C. to 150°C.). The time of contact of the solution of silica source and the precipitating reagent can range from about 10 minutes to several hours at pH maintained from about 6 to 11. Generally, the silica precursor is processed by isolating it, for example by filtration, and removing soluble contaminants therefrom by washing and/or ion exchange. This stage can be considered a solids consolidation step.

The ZSM-11 composition as prepared hereby has a characteristic X-ray diffraction pattern, the values of which are set forth in Table 1, hereinafter. The ZSM-11 composition as prepared hereby can also be identified, in terms of mole ratios of oxides and in the anhydrous state, as-synthesized, as follows:

$$(0.5-10.0)R:(0-0.5M_2O:Al_2O_3:xSiO_2$$

wherein M and R are as defined above, and x is from about 40 to greater than about 2000.

TABLE 1

| Interplanar d-Spacing (A) | Relative Intensity ($I/I_o$) |
| --- | --- |
| 11.2 ± .2 | Medium |
| 10.1 ± .2 | Medium |
| 6.73 ± .2 | Weak |
| 5.75 ± .1 | Weak |
| 5.61 ± .1 | Weak |
| 5.03 ± .1 | Weak |
| 4.62 ± .1 | Weak |
| 4.39 ± .08 | Weak |
| 3.86 ± .07 | Very Strong |
| 3.73 ± .07 | Medium |
| 3.49 ± .07 | Weak |
| (3.07, 3.00) ± .05 | Weak |

TABLE 1-continued

| Interplanar d-Spacing (A) | Relative Intensity ($I/I_o$) |
| --- | --- |
| 2.01 ± .02 | Weak |

The parenthesis around lines 3.07 and 3.00 indicate that they are separate and distinct lines, but are often superimposed.

The original "M" cations, e.g. alkali metal, can be replaced, at least in part, by ion exchange with other cations. Thus, the original cations are exchanged into a hydrogen or hydrogen ion precursor form or a form in which the original cation has been replaced by a metal of Groups IIA, IIIA, IVA, IB, IIB, IIIB, IVB, VIB or VIII of the Periodic Table. Thus, for example, it is contemplated to exchange the original cations with ammonium ions or with hydronium ions. Catalytically active forms of these would include, in particular, hydrogen, rare earth metals, aluminum, metals of Groups II and VIII of the Periodic Table and manganese.

These X-ray diffraction data were collected with a Philips diffraction system, equipped with a graphite diffracted beam monochromator and scintillation counter, using copper K-alpha radiation. The diffraction data were recorded by step-scanning at 0.04 degrees of two-theta, where theta is the Bragg angle, and a counting time of 4 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (60-100), s=strong (40-60), m=medium (20-40) and w=weak (0-20). It should be understood that diffraction data listed for this sample as single lines may consist of multiple overlapping lines which under certain conditions, such as differences in crystallite sizes or very high experimental resolution or crystallographic changes, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition, nature and degree of pore filling, and thermal and/or hydrothermal history.

While the improved crystalline silicate of the present invention may be used in a wide variety of organic compound, e.g. hydrocarbon compound, conversion reactions, it is notably useful in the processes of cracking, hydrocracking and dewaxing.

Synthetic ZSM-11 prepared in accordance herewith can be used either in the as-synthesized form, the alkali metal form and hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to zeolite ZSM-11 such as, for example, by, in the case of platinum, treating the zeolite with a platinum metal-containing ion. Suitable platinum compounds for this purpose include chloroplatinic acid, platinous chloride and various compounds containing the platinum amine complex. Combinations of metals and methods for their introduction can also be used.

Synthetic ZSM-11, when employed either as an adsorbent or as a catalyst in a hydrocarbon conversion process, should be dehydrated at least partially. This can be done by heating to a temperature in the range of from about 65° C. to about 550° C. in an inert atmosphere, such as air, nitrogen, etc. and at atmospheric or subatmospheric pressures for between 1 and 48 hours. Dehydration can be performed at lower temperature merely by placing the zeolite in a vacuum, but a longer time is required to obtain a particular degree of dehydration. The thermal decomposition product of the newly synthesized ZSM-11 can be prepared by heating same at a temperature of from about 200° C. to about 550° C. for from 1 hour to about 48 hours.

As above mentioned, synthetic ZSM-11 prepared in accordance herewith can be ion exchanged without a pre-calcination step to have original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earths, Mn, Ca, Mg, Zn, Cd, Pd, Ni, Cu, Ti, Al, Sn, Fe and Co.

Typical ion exchange technique would be to contact the synthetic zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the ZSM-11 is then preferably washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active thermal decomposition product thereof.

Regardless of the cation replacing the alkali metal in the synthesized form of the ZSM-11, the spatial arrangement of the aluminum, silicon and oxygen atoms which form the basic crystal lattice of ZSM-11 remains essentially unchanged by the described replacement of alkali metal as determined by taking an X-ray powder diffraction pattern of the ion-exchanged material.

The crystalline silicate prepared by the instant invention may be formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline silicate can be extruded before drying or dried or partially dried and then extruded.

In the case of many catalysts, it is desired to incorporate the ZSM-11 hereby prepared with another material resistant to the temperatures and other conditions employed in certain organic conversion processes. Such matrix materials include active and inactive materials and synthetic or naturally occurring zeolites as well as incorganic materials such as clays, silica and/or metal oxides, e.g. alumina. The latter may be either naturally occurring or in the form of gelatinous precipitates, sols or gels including mixtures of silica and metal oxides. Use of a material in conjunction with the ZSM-11, i.e. combined therewith, which is active, may enhance the conversion and/or selectively of the catalyst in certain organic conversion processes. Inactive materials suitably serve as diluents to control the amount of conversion in a given process so that products can be obtained economically and orderly without employing other means for controlling the rate or reaction. Frequently, crystalline silicate materials have been incorporated into naturally occuring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, whch tends to break the catalyst down into powder-like materials which cause problems in processing.

Naturally occuring clays which can be composited with the hereby synthesized ZSM-11 include montmorillonite and kaolin families which include the subbentonies, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the ZSM-11 crystals hereby synthesized can be composited with a porous matrix material such as silica-alumina, silica-magnesia, silica-zirconia, silica-thoria, silica-beryllia, silica-titania, as well as ternary compositions such as silica-alumina-thoria, silia-alumina-zirconia, silica-alumina-magnesia and silica-magnesia-zirconia. The matrix can be in the form of a cogel. A mixture of these components could also be used.

The relative proportion of finely divided crystalline silicate and matrix vary widely with the crystalline silicate content ranging from about 1 to about 90 percent by weight, and more usually in the range of about 2 to about 50 percent by weight of the composite.

The present invention provides a low cost ZSM-11 catalyst component for converting a feedstock comprising hydrocarbon compounds to conversion product comprising hydrocarbon compounds of lower molecular weight than feedstock hydrocarbon compounds which comprises contacting said feedstock at conversion conditions sufficient to convert said feedstock to said product.

In a specific embodiment, the present ZSM-11 is useful in a process for catalytically dewaxing a heavy oil stock to provide a catalytically dewaxed oil with reduced wax content which comprises contacting said oil stock at catalytic dewaxing conditions in a reaction zone in the presence of hydrogen with a catatlyst composition as herein defined.

In another specific embodiment, the present ZSM-11 is useful in a process for catalytically hydrodewaxing a lubricating oil base stock to provide a catalytically hydrodewaxed lubricating oil base stock with reduced wax content which comprises contacting said stock at catalytic hydrodewaxing conditions in a reaction zone in the presence of hydrogen with a catalyst composition as herein defined.

In general, conversion conditions for the process catalyzed by the present improved ZSM-11 include a temperature of from about 100° C. to about 800° C., a pressure of from about 0.1 atmosphere (bar) to about 200 atmospheres, a weight hourly space velocity of from about 0.08 $hr^{-1}$ to about 2000 $hr^{-1}$ or a liquid hourly space velocity of from about 0.5 $hr^{-1}$ to about 100 $hr^{-1}$, and a hydrogen/feedstock hydrocarbon compound mole ratio of from 0 (no added hydrogen) to about 100.

Such a conversion process includes, as a non-limiting example, cracking hydrocarbons to lower molecular weight hydrocarbons with reaction conditions preferably including a temperature of from about 230° C. to about 800° C., a pressure of from about 0.1 atmosphere (bar) to about 35 atmospheres, a weight hourly space velocity of from about 0.1 $hr^{-1}$ to about 200 $hr^{-1}$ or a liquid hourly space velocity of from about 0.6 $hr^{-1}$ to about 10 $hr^{-1}$, and a hydrogen/feedstock hydrocarbon compound mole ratio of from 0 to about 100.

When the feedstock to the catalytic process comprises a heavy oil stock to be dewaxed, preferred conversion temperature is from about 230° C. to about 500° C. When the feedstock comprises a lubricating oil base stock to be dewaxed, preferred conversion temperature is also from about 230° C. to about 500° C., with a hydrogen/feedstock lubricating oil base stock mole ratio of from 0 to about 100.

In order to more fully illustrate the nature of the invention and the manner of practicing same, the following examples are presented. In the examples, whenever sorption data are set forth for comparision of sorptive capacities for vapors of water, cyclohexane and/or n-hexane, they were determined as follows:

A weighed sample of the calcined adsorbant was contacted with the desired pure adsorbate vapor in an adsorption chamber, evacuated to less than 1 mm and contacted with 40 mm Hg of n-hexane or cyclohexane vapor, or 12 mm Hg of water vapor, pressures less than the vapor-liquid equilibrium pressure of the respective adsorbate at 90° C. The pressure was kept constant (within about ±0.5 mm) by addition of adsorbate vapor controlled by a manostat during the adsorption period, which did not exceed about 8 hours. As adsorbate was adsorbed by the crystal, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 $sec^{-1}$). The Alpha Test is described in U.S. Pat. No. 3,354,078; and in the *Journal of Catalysis,* vol. 4, p. 527 (1965); each incorporated herein by reference as to that description.

It is noted that intrinsic rate constants for many acid-catalyzed reactions are proportional to the Alpha Value for a particular crystalline silicate catalyst, i.e. the rates for toluene disproportionation, xylene isomerization, alkene conversion and methanol conversion (see "The Active Site of Acidic Aluminosilicate Catalysts," *Nature*, Vol. 309, No. 5969, pp. 589-591, 14 June 1984).

EXAMPLE 1

An 85.0 g quantity of octylamine was added to a solution containing 39.5 g $Al_2(SO_4)_3 \cdot xH_2O$, 133.0 g 50% NaOH solution and 602 g water. The resulting solution was added to 717 g of ammonium form of amorphous silica precursor (47.5% solids) prepared by neutralizing a sodium silicate solution in a continuous manner under carefully controlled conditions, collecting the precipitated solids, washing them with water to be anion free, and washing the anion-free solids with ammonium nitrate.

More particularly with regard to the silica precursor synthesis, an acid solution was prepared by adding concentrated sulfuric acid to demineralized water to achieve a concentration of about 24 weight percent acid. A silicate solution was prepared separately by dissolving 100 parts of sodium silicate (29% $SiO_2$, 9% $Na_2O$ and 50% NaOH) and 1.03 parts of 50% NaOH in 98.9 parts of demineralized water. The silicate solution and acid solution were pumped into a stirred reaction vessel containing water in a continuous manner at a silicate/acid mole ratio of about 1/1. The reaction was carried out in the vessel at a pH of about 8, a temperature within the range of 27° C. to 150° C., and an average residence time of about 30 minutes. Product amorphous precipitate was discharged continuously from the vessel by an overflow tube, collected, filtered, washed with demineralized water to be sulfate free and then washed with ammonium nitrate.

A 4.23 quantity of ZSM-11 seed crystals was then added to the mixture of octylamine, aluminum sulfate, sodium hydroxide, water and silica precursor to form the reaction mixture for the present synthesis. The reaction mixture having a composition in mole ratios of $SiO_2/Al_2O_3 = 85.4$
$H_2O/SiO_2 = 10.2$
$OH^-/SiO_2 = 0.22$
$Na^+/SiO_2 = 0.3$
Octylamine/$SiO_2 = 0.11$ and a solids content of 22 wt.%, was thoroughly mixed.

The mixture was then crystallized in a stainless steel reactor with agitation for 2 days at 120° C., followed by 3 days at 143° C. The crystalline product was separated from unreacted material by filtration, washed with water and dried at 120° C.

The dried crystalline product was submitted for chemical and X-ray diffraction analysis. Table 2 lists the analytical composition of the product. X-ray diffraction anaylsis established the product of this example to be ZSM-11 (crystallinity=170% based on standard sample).

TABLE 2

| | |
|---|---|
| $SiO_2$ | = 83.8 wt. % |
| $Al_2O_3$ | = 2.2 wt. % |
| Na | = 0.11 wt. % |
| N | = 0.78 wt. % |
| Ash | = 88.3 wt. % |
| $SiO_2/Al_2O_3$, molar ratio | = 64.8 |

EXAMPLE 2

A portion of the crystalline product of Example 1 was calcined at 538° C. for 3 hours in air and tested for sorption capacities. The sorption capacities were found to be as follows:

Cyclohexane (40 Torr)=7.1 wt.%
n-Hexane (40 Torr)=11.7 wt.%
Water (12 Torr)=5.4 wt.%

The calcined sample was also found to have a surface area of 326 $m^2g$.

EXAMPLE 3

A portion of the dried Example 1 product was ammonium exchanged without prior calcination to a sodium level of 0.01 wt.% and tested for Alpha Value, which proved to be 410.

EXAMPLE 4

For comparative purposes, the synthesis procedure of Example 1 was repeated, except without the ZSM-11 seed crystals in the reaction mixture. The crystalline product was recovered, washed and dried as in Example 1. The dried product was submitted for X-ray analysis, the results of which proved it to be a mixture of ZSM-11 with ZSM-5.

EXAMPLE 5

For comparative purposes, the synthesis procedure of Example 1 was again repeated, except without the octylamine component in the reaction mixture. X-ray analysis of the dried product of this example proved it to be a mixture of ZSM-5 and Magadiite. There was no ZSM-11 product.

Summary of Examples 1, 4 and 5

| Example | Octylamine | ZSM-11 Seeds | Product |
|---|---|---|---|
| 1 | yes | yes | 170% crystalline ZSM-11 |
| 4 | yes | no | ZSM-11 + ZSM-5 |
| 5 | no | yes | ZSM-5 + Magadiite |

EXAMPLES 6-11

Experiments listed in Table 3 further demonstrate the present improved method for synthesis of crystalline ZSM-11. Amorphous silica precipitate precursor, prepared as in Example 1, was used as the source of silicon in Examples 6-9. Solid silica, i.e. Ultrasil, was used as the silicon source in Examples 10 and 11.

Products from each example were recovered by filtration, washed with water and dried at 120° C. Samples of the dried products were analyzed by X-ray diffraction and for chemical composition. Samples of each product were calcined at 538° C. as in Example 2 and tested for sorption capacities and surface area.

The results are also listed in Table 3.

TABLE 3

| Example | 6 | 7 | 8 | 9 | 10 | 11 |
|---|---|---|---|---|---|---|
| Synthesis Mixture, mole ratios | | | | | | |
| $SiO_2/Al_2O_3$ | 85.4 | 85.4 | 85.4 | * | 341 | * |
| $OH^-/SiO_2$ | 0.22 | 0.19 | 0.22 | 0.20 | 0.10 | 0.20 |

TABLE 3-continued

| Example | 6 | 7 | 8 | 9 | 10 | 11 |
|---|---|---|---|---|---|---|
| $H_2O/SiO_2$ | 10.2 | 10.2 | 10.2 | 17.2 | 17.1 | 17.2 |
| Octylamine/$SiO_2$ | 0.11 | 0.11 | 0.06 | 0.10 | 0.11 | 0.10 |
| Seeds, wt. % | 1 | 1 | 1 | 1 | 1 | 1 |
| Solids, wt. % | 22 | 22 | 22 | 15.3 | 15.3 | 15.0 |
| Crystallization, Stirred | | | | | | |
| Temp, °C./Days | 120/2 | 120/2 | 120/2 | 120/2 | 140/6 | 140/6 |
| Temp, °C./Days | 143/3 | 143/3 | 143/3 | 143/3 | | |
| X-Ray Analysis | ZSM-11 | ZSM-11 | ZSM-11 | ZSM-11 | ZSM-11 | ZSM-11 |
| | 155% | 150% | 165% | 235% | 185% | ** |
| Product Composition, wt % | | | | | | |
| $SiO_2$ | 86.2 | 87.3 | 84.1 | 94.4 | 86.2 | 90.0 |
| $Al_2O_3$ | 2.2 | 2.3 | 2.0 | 0.14 | 0.61 | 0.145 |
| Na | 880 ppm | 845 ppm | 1280 ppm | 0.28 | 0.17 | 0.59 |
| N | 0.87 | 0.83 | 0.65 | 0.52 | 0.82 | 0.61 |
| Ash | 88.5 | 88.9 | 89.2 | 88.9 | 90.0 | 90.2 |
| $SiO_2/Al_2O_3$, mole ratio | 66.6 | 64.5 | 71.5 | 1114 | 240 | 1055 |
| Adsorption, wt. % | | | | | | |
| Cyclohexane | 8.9 | 8.0 | 7.9 | — | 6.4 | 4.2 |
| n-Hexane | 12.6 | 12.0 | 12.9 | — | 10.6 | 7.5 |
| Water | 6.1 | 5.9 | 6.6 | — | 2.4 | 1.6 |
| Surface Area, $m^2/g$ | 345 | 355 | 333 | — | 309 | 210 |

*Alumina present at impurity level.
**Trace cristobalite impurity

What is claimed is:

1. In a method for synthesizing a crystalline silicate having the structure of ZSM-11 exhibiting a characteristic X-ray diffraction pattern as shown in Table 1 of the specification, which comprises preparing a mixture capable of forming said silicate, said mixture comprising a source of alkali metal cations (M), a source of silicon and water, maintaining said mixture under sufficient conditions until crystals of said silicate are formed and recovering said crystalline silicate having the structure of ZSM-11, the improvement wheren said mixture further comprises octyalmine (R) and seed crystals of ZSM-11 structure, said mixture having a composition, in terms of mole ratios, within the following ranges:

$SiO_2/Al_2O_3 = 40-2000$
$H_2O/SiO_2 = 5-50$
$OH^-/SiO_2 = 0.05-0.5$
$M/SiO_2 = 0.05-0.5$
$R/SiO_2 = 0.03-1.0$ said recovered crystalline silicate containing said R and M.

2. The recovered crystalline silicate of claim 1.

3. The method of claim 1 wherein said mixture comprises at least about 0.01 wt.% seed crystals of ZSM-11 structure.

4. The method of claim 1 wherein said mixture comprises at least about 0.1 wt.% seed crystals of ZSM-11 structure.

5. The method of claim 1 wherein said mixture comprises from about 1 wt.% to about 5 wt.% seed crystals of ZSM-11 structure.

6. The method of claim 1 wherein said source of silicon is a solid silica or an amorphous silica precipitate.

7. The method of claim 1 wherein said source of silicon is a solid silica.

8. The method of claim 1 wherein said source of silicon is an amorphous silica precipitate.

9. The method of claim 1 comprising replacing alkali metal cations of the recovered crystalline silicate, at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

10. The method of claim 9 wherein said replacing cation is hydrogen or a hydrogen precursor.

11. The method of claim 3 comprising replacing alkali metal cations of the recovered crystalline silicate, at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

* * * * *